United States Patent
Miyazaki et al.

(10) Patent No.: US 8,113,169 B2
(45) Date of Patent: Feb. 14, 2012

(54) DEVICE FOR CONTROLLING HEATING OF A THROTTLE VALVE OF AN INTERNAL COMBUSTION ENGINE

(75) Inventors: Tsutomu Miyazaki, Aichi-ken (JP); Akihiro Kamiya, Takahama (JP); Naoto Miyauchi, Aichi-ken (JP)

(73) Assignees: Toyota Jidosha Kabushiki Kaisha, Aichi (JP); Aisan Kogyo Kabushiki Kaisha, Aichi (JP)

( * ) Notice: Subject to any disclaimer, the term of this patent is extended or adjusted under 35 U.S.C. 154(b) by 533 days.

(21) Appl. No.: 12/304,682

(22) PCT Filed: Jun. 14, 2007

(86) PCT No.: PCT/JP2007/062002
§ 371 (c)(1),
(2), (4) Date: Apr. 7, 2009

(87) PCT Pub. No.: WO2008/004421
PCT Pub. Date: Jan. 10, 2008

(65) Prior Publication Data
US 2009/0194078 A1 Aug. 6, 2009

(30) Foreign Application Priority Data
Jun. 14, 2006 (JP) .................................. 2006-164353

(51) Int. Cl.
*F02D 9/08* (2006.01)
(52) U.S. Cl. ........................................ 123/337; 123/549
(58) Field of Classification Search .................. 123/549, 123/337
See application file for complete search history.

(56) References Cited

U.S. PATENT DOCUMENTS

| 5,209,211 A * | 5/1993 | Kopp et al. ................... 123/549 |
| 6,467,468 B1 | 10/2002 | Powell |
| 2004/0016416 A1 | 1/2004 | Ichihara et al. |
| 2004/0182370 A1* | 9/2004 | Parkinson et al. ............. 123/549 |
| 2006/0213483 A1* | 9/2006 | Miyachi ........................ 123/399 |

FOREIGN PATENT DOCUMENTS

| DE | 42 34 460 A1 | 4/1994 |
| JP | 02-169923 A | 6/1990 |
| JP | 04-119337 A | 10/1992 |
| JP | 06-017718 A | 1/1994 |
| JP | 10-026033 A | 1/1998 |
| JP | 10-331621 A | 12/1998 |
| JP | 2002-242706 A | 8/2002 |
| JP | 2004-052636 A | 2/2004 |
| JP | 2005-307939 A | 11/2005 |

* cited by examiner

*Primary Examiner* — Michael Cuff
*Assistant Examiner* — James Kim
(74) *Attorney, Agent, or Firm* — Sughrue Mion, PLLC

(57) ABSTRACT

In an embodiment, conductance of electricity to a heating element (4) for heating a throttle valve (2) of an automobile engine and a peripheral section thereof is performed only during a period wherein this heating can be performed effectively. Specifically, a controller (53) receives an output signal from an air flow sensor (54), and when a quantity of intake air is equal to or less than a predetermined "intake air quantity criterion for heating", conduction of electricity to the heating element (4) is carried out. Conversely, when the quantity of intake air is greater than this "intake air quantity criterion for heating", conduction of electricity to the heating element 4 is prohibited.

20 Claims, 5 Drawing Sheets

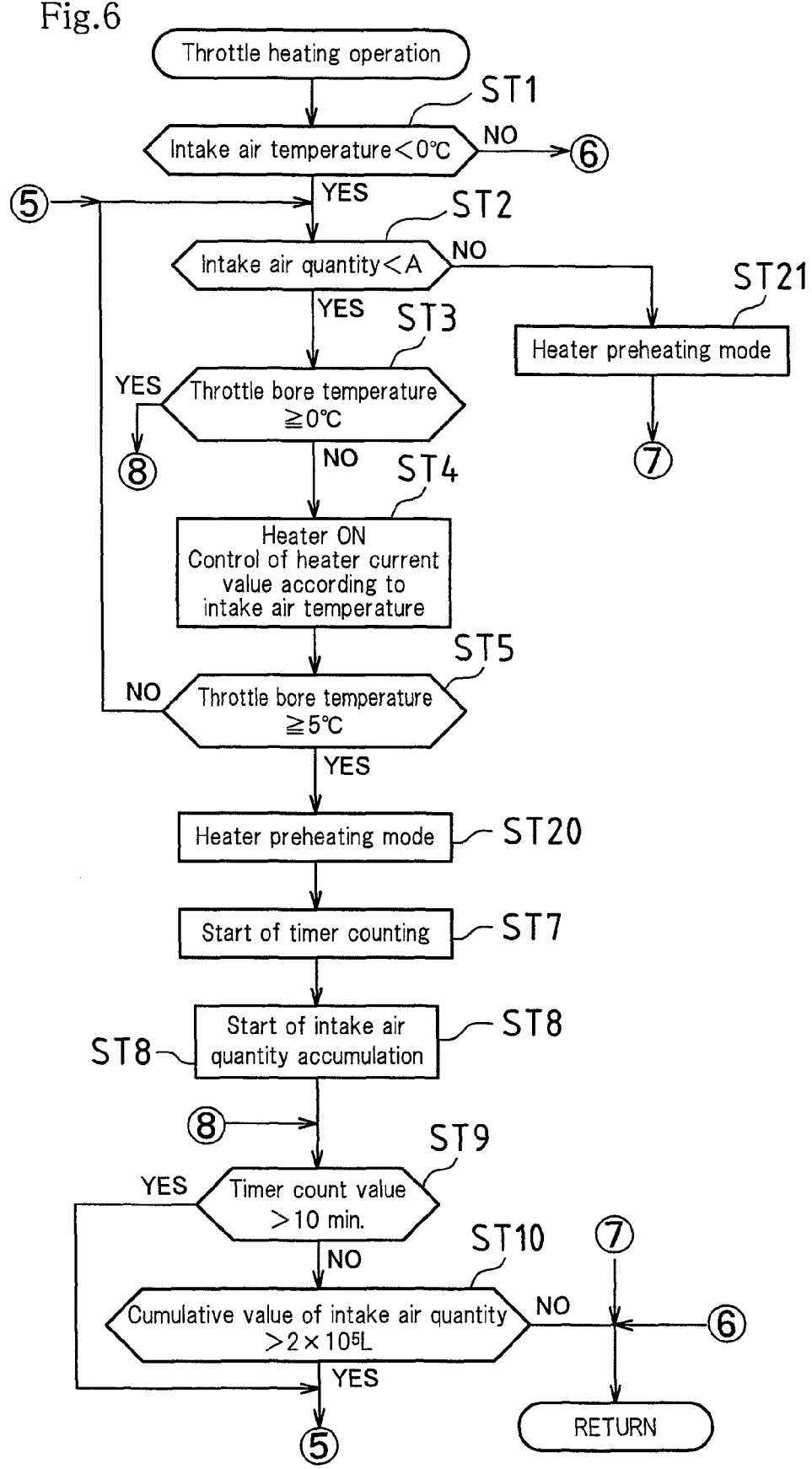

DEVICE FOR CONTROLLING HEATING OF A THROTTLE VALVE OF AN INTERNAL COMBUSTION ENGINE

TECHNICAL FIELD

The present invention relates to a throttle valve heating control device for preventing or eliminating freezing of moisture in the vicinity of a throttle valve of an internal combustion engine. In particular, the present invention relates to an improvement for realization of a throttle valve heating action, whereby a significant reduction in energy loss is possible.

BACKGROUND ART

Conventionally, in a standard automobile engine (for example, a gasoline engine), a throttle valve (intake-air throttle valve) is provided inside an intake air pipe, and an intake air quantity is adjusted by controlling a degree of opening of this throttle valve.

Incidentally, in winter and in other cases wherein an external air temperature is low, moisture contained in the intake air freezes (icing) in the vicinity of the throttle valve, and this throttle valve may become bonded through freezing to an inner surface of the intake air pipe (an inner surface of an intake air channel of a throttle body). Particularly during an idling operation wherein the degree of opening of the throttle valve is small, freezing of moisture between an outer peripheral edge of the throttle valve and an inner surface of the intake air pipe occurs more readily. In such a condition, the throttle valve becomes unable to operate correctly, causing driving of the engine to be obstructed.

In order to prevent or eliminate the above-mentioned freeze bonding of the throttle valve, a peripheral section of the throttle valve within the throttle body is heated using an engine coolant as disclosed in, for example, Patent Document 1 and Patent Document 2 below. More specifically, a channel for supplying the engine coolant is formed inside the throttle body, and by connecting this channel and a water jacket via piping, high temperature engine coolant is caused to flow to the peripheral section of the throttle valve, and consequently, freezing of the moisture inside the intake air channel can be prevented or ice frozen inside the intake air channel can be melted.

However, in a configuration wherein freeze bonding of the throttle valve is prevented or eliminated using the engine coolant as explained above, it is necessary for the engine coolant channel formed in the throttle body and the engine cooling system (water jacket) to be connected via piping, and it has been difficult to secure space for provision of this piping. Furthermore, as the above-mentioned prevention and elimination of freeze bonding will not be accomplished if the temperature of the engine coolant does not rise to a certain degree, heating of the peripheral section of the throttle valve prior to starting of the engine and sufficient heating of the peripheral section of the throttle valve during a short period of time after starting of the engine were not possible.

As a means of resolving these problems, heating of the peripheral section of the throttle valve using an electric heater and preventing or eliminating freeze bonding thereof has been proposed as disclosed in Patent Document 3 below.

Patent Document 1: JP H10-331621A
Patent Document 2: JP 2002-242706A
Patent Document 3: JP H10-26033A

DISCLOSURE OF INVENTION

Problem to be Solved by the Invention

Incidentally, in a case wherein the throttle valve is heated using an electric heater as explained above, an electric heater with an extremely large heat generation quantity must be used in order to acquire an amount of heat sufficient for effective operation of a freezing prevention function or a freezing elimination function similar to that of the above-mentioned Patent Document 1 and Patent Document 2, which utilize a quantity of heat of the engine coolant. For this reason, an expensive electric heater and a large space for installation thereof become necessary. In addition, energy loss increases due to large power consumption, and as a result thereof, a fuel consumption rate of the automobile deteriorates.

As a solution to the above-described problems, the present invention provides a device for controlling heating of a throttle valve of an internal combustion engine facilitating effective prevention and elimination of freeze bonding of the throttle valve while also facilitating usage of a small electric heater and keeping energy loss low.

Means for Solving Problem

-Problem Resolution Principle-

The resolution principle of the present invention employed in order to accomplish the above-mentioned object is to keep a period of conductance of electricity to an electric heater in order to heat a throttle valve of an internal combustion engine and a peripheral section thereof at the required minimum, or more specifically, to conduct electricity to the electric heater only during a period wherein this heating can be performed effectively, or in other words, to conduct electricity to the electric heater in a situation wherein a small amount of electrical energy is sufficient to raise the temperature of the throttle valve and the peripheral section thereof to a temperature in excess of the freezing point, thus making it possible to effectively prevent or eliminate freeze bonding of the throttle valve while also keeping energy loss low.

-Resolution Means-

In specific terms, the present invention is based on the assumption of a device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity. This device for controlling heating of a throttle valve is provided with an intake-air quantity detection means for detecting a quantity of intake air flowing through the above-mentioned intake air channel and a throttle-valve heating control means for receiving an output from this intake-air quantity detection means, conducting electricity to the electric heater when the quantity of intake air flowing in the intake air channel is equal to or less than a predetermined "intake air quantity criterion for heating", and prohibiting conductance of electricity to the electric heater when the quantity of intake air flowing in the intake air channel is greater than the above-mentioned "intake air quantity criterion for heating".

In accordance with this particular configuration, when the quantity of intake air flowing in the intake air channel is greater than the above-mentioned "intake air quantity criterion for heating" during driving of the internal combustion engine, or in terms of application in an internal combustion engine for an automobile, for example, in a case wherein the speed of the internal combustion engine is relatively high, such as during high speed driving of the vehicle, etc., even if heating is performed by conducting electricity to the electric heater, the majority of a quantity of heat thereof is lost to intake air flowing through the intake air channel, and therefore, a contribution to heating of the throttle valve and the peripheral section thereof reduces to almost zero. For this reason, when the intake air quantity exceeds the "intake air quantity criterion for heating" as described above, a wasteful heating operation is prevented from being carried out by prohibiting the conductance of electricity to the electric heater.

Meanwhile, when the quantity of intake air flowing through the intake air channel is equal to or less than the above-mentioned "intake air quantity criterion for heating" in a case wherein, for example, the speed of the internal combustion engine is relatively low, such as during low speed driving of the vehicle or an idling operation, etc., the amount of the heat generation quantity of the electric heater lost to the intake air flowing through the intake air channel is small. Furthermore, as intake air is not flowing through the intake air channel when the internal combustion engine is stopped (for example, when the ignition key is in an accessory position), most of the heat generation quantity of the electric heater can be made to contribute to heating of the throttle valve and the peripheral section thereof. For this reason, the present invention is configured such that, when the intake air quantity is equal to or less than the "intake air quantity criterion for heating" as described above (including when the intake air quantity is "0"), electricity is conducted to the electric heater so that an effective heating operation can be carried out. Through control of conductance of electricity to the electric heater according to the intake air quantity in this way, it is possible to effectively prevent or eliminate freeze bonding of the throttle valve while also keeping energy loss low. Furthermore, as heating of the throttle valve more than necessary does not occur, it is possible to prevent rising of the temperature of the intake air pursuant to rising of the temperature of this throttle valve, and as a result thereof, the efficiency of filling of air into a cylinder can be kept high and a high power output of the internal combustion engine can be maintained.

An example of another resolution means for accomplishing the above-mentioned object is configured as follows. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity is assumed. This device for controlling heating of a throttle valve is provided with an intake-air quantity detection means for detecting a quantity of intake air flowing through the above-mentioned intake air channel and a throttle-valve heating control means for receiving an output from this intake-air quantity detection means and controlling the conductance of electricity to the electric heater according to the quantity of intake air flowing in the intake air channel. In addition, this throttle-valve heating control means is configured such that the greater the quantity of intake air flowing in the intake air channel, the smaller the quantity of conductance of electricity to the electric heater is set.

In accordance with this particular configuration also, through control of conductance of electricity to the electric heater according to the intake air flowing through the intake air channel, it is possible to effectively prevent or eliminate freeze bonding of the throttle valve while also keeping energy loss low. That is to say, in a condition wherein, even if heating is performed by conducting electricity to the electric heater, an intake air quantity whereat the majority of the quantity of heat thereof is lost to intake air is large, the quantity of conductance of electricity to the electric heater is set smaller (current value is set smaller or voltage value is set smaller) or is set to "0". In this way, the present invention is configured so as to prevent wasteful conductance of electricity. In contrast, in a condition of low or "0" intake air quantity wherein most of the heat generation quantity of the electric heater can be made to contribute to heating of the throttle valve and the peripheral section thereof (for example, when the ignition key is in an accessory position), a quantity of conductance of electricity to the electric heater is set larger (current value is set larger or voltage value is set larger). As a result thereof, it becomes possible to effectively prevent or eliminate freeze bonding of the throttle valve.

An example of another resolution means for accomplishing the above-mentioned object is configured as follows so as to control the conductance of electricity to the electric heater according to an intake air temperature. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity is assumed. This device for controlling heating of a throttle valve is provided with an intake-air temperature detection means for detecting a temperature of intake air flowing through the above-mentioned intake air channel and a throttle-valve heating control means for receiving an output from this intake-air temperature detection means and controlling the conductance of electricity to the electric heater according to the temperature of intake air flowing in the intake air channel. In addition, this throttle-valve heating control means is configured such that the higher the temperature of intake air flowing in the intake air channel, the smaller the quantity of conductance of electricity to the electric heater is set.

Through control of conductance of electricity to the electric heater according to the intake air temperature in accordance with this particular configuration, it is possible to effectively prevent or eliminate freeze bonding of the throttle valve while also keeping energy loss low. That is to say, as the likelihood of freeze bonding of the throttle valve is low in a condition wherein the intake air temperature is relatively high, the quantity of conductance of electricity to the electric heater is set smaller (current value is set smaller or voltage value is set smaller) or to "0" in such a condition. In this way, the present invention is configured such that wasteful conductance of electricity does not occur. In contrast, as the likelihood of present or future freeze bonding of the throttle valve is high in a condition wherein the intake air temperature is relatively low, the quantity of conductance of electricity to the heating element is set larger (current value is set larger or voltage value is set larger) in such a condition. In addition, with a configuration wherein, the smaller this intake air temperature, the larger the quantity of conductance of electricity to the electric heater is set, freeze bonding of the throttle valve can be reliably prevented or eliminated. Specifically, conductance of electricity to the electric heater is not carried out in summer, and the quantity of conductance of electricity to the electric heater is set larger only in winter and in a time band wherein the outside air temperature is particularly low. By setting the quantity of conductance of electricity to the electric heater larger only in limited conditions as described above, it is possible to keep energy loss low.

Furthermore, examples of other resolution means for accomplishing the above-mentioned object are configured so as to determine a timing for conductance of electricity to the electric heater in terms of time or based on a cumulative intake air quantity of the internal combustion engine.

First of all, the following is an example of a configuration in a case wherein a timing for conductance of electricity to the electric heater is determined in terms of time. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity is assumed. This device for controlling heating of a throttle valve is provided with a timer means for measuring an elapsed time after ending of a previous heating operation of the electric heater and a throttle-valve heating control means for receiving an output from the timer means and starting conductance of electricity to the electric heater when a predetermined "elapsed time criterion for heating" has elapsed after ending of the previous heating operation of the electric heater.

Furthermore, the following is an example of a configuration in a case wherein a timing for conductance of electricity to the electric heater is determined based on a cumulative intake air quantity. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity is assumed. This device for controlling heating of a throttle valve is provided with a cumulative intake-air quantity calculation means for calculating a cumulative value of a quantity of intake air after ending of a previous heating operation of the electric heater and a throttle-valve heating control means for receiving an output from the cumulative intake-air quantity calculation means and starting an operation of conductance of electricity to the electric heater when the cumulative value of the quantity of intake air after ending of the previous heating operation of the electric heater has reached a predetermined "cumulative intake-air quantity criterion for heating".

In accordance with these particular configurations, it is possible to avoid a situation wherein strong freeze bonding occurs due to a large quantity of ice adhering to the periphery of the throttle valve by regularly performing a freeze bonding prevention or elimination operation with respect to the throttle valve through the operation of conductance of electricity to the electric heater at each predetermined timing (each predetermined elapsed time, each predetermined cumulative intake air quantity).

A specific example of a control operation that can be used in each of the above-explained resolution means, and that, after starting of an operation of conductance of electricity to the electric heater, ends this operation of conductance of electricity is as follows. That is to say, the example is configured such that the heating operation of the electric heater resulting from conductance of electricity to the electric heater is continued until the throttle valve and the peripheral section thereof reach a "heating completion temperature" equal to or greater than the freezing point temperature.

In accordance with this particular configuration, the operation of conductance of electricity to the electric heater is ended after heating the throttle valve and the peripheral section thereof to a temperature whereat freeze bonding of the throttle valve can be reliably prevented or eliminated. For this reason, only the required minimum operation of conductance of electricity to the electric heater can be performed and energy loss can be kept low. It should be noted that an example of the "heating completion temperature" mentioned here is 5° C.

Although the purpose of the above configurations was to execute an operation that prevents or eliminates freeze bonding of the throttle valve, preheating of the throttle valve and the peripheral section thereof may also be carried out in order to reliably prevent or eliminate freeze bonding of the throttle valve through the execution of this operation. A specific example of a configuration for performing this preheating operation is as follows.

One of the above-mentioned resolution means is provided with a valve temperature detection means for detecting a temperature of the throttle valve or the periphery thereof and a preheating means for receiving an output from this valve temperature detection means, conducting electricity to the electric heater in order to preheat the throttle valve and the periphery thereof according to the temperature of the throttle valve or the periphery thereof, and ending conductance of electricity to the electric heater, regardless of the temperature of the throttle valve or the periphery thereof, when a predetermined period of time has passed.

Furthermore, another example of a configuration for performing preheating of the throttle valve and the peripheral section thereof is as follows. In contrast to the above-explained configuration wherein the heating operation of the electric heater resulting from conductance of electricity to the electric heater continues until the throttle valve and the peripheral section thereof reach a "heating completion temperature" equal to or greater than a freezing point temperature, this example is configured such that the electric heater is configured to continue heating with a quantity of conductance of electricity to the electric heater set smaller than a quantity of conductance of electricity during the heating operation of the electric heater after the throttle valve and the peripheral section thereof have reached the heating completion temperature equal to or greater than a freezing point temperature due to the heating operation of the electric heater resulting from conductance of electricity to the electric heater.

Whereas the former preheating operation performs intermittent preheating, whereby a preheating operation is performed each time a predetermined preheating condition is satisfied, the latter preheating operation performs continuous preheating by performing continuous conductance of electricity to the electric heater. As a result of performing these preheating operations in advance, the quantity of ice adhering to the periphery of the throttle valve is small upon starting of the above-mentioned heating operation of the electric heater due to a need for elimination of freeze bonding of the throttle valve, and in addition, the periphery of the throttle valve is maintained at a temperature that is high to some extent (higher temperature than the temperature of the intake air. Accordingly, it is possible to rapidly elevate the periphery of the throttle valve to the freezing point temperature or thereabove after starting of the heating operation of the electric heater, and elimination of freeze bonding of the throttle valve can be completed in a short period of time. That is to say, energy loss can be reduced pursuant to shortening of the heating operation time of this electric heater.

In specific terms, a PTC (Positive Temperature Coefficient) heater can be applied as the electric heater of each of the above-explained resolution means. This PTC heater has a characteristic of an electrical resistance value increasing in accordance with the temperature becoming higher. At the start of a heating operation of the electric heater, therefore, when a heating operation is started by conducting electricity to the electric heater at a specific current value, the electrical resistance value of the electric heater also rises in accordance with a temperature increase thereof and the current value becomes gradually smaller. Consequently, the heater temperature can be maintained at a substantially constant value without any need for a special control operation such as current control, etc., making it possible to simplify a configuration of a heating control device and to prevent overheating of the throttle valve and the peripheral section thereof.

BRIEF DESCRIPTION OF DRAWINGS

FIG. 6 is a flowchart for explaining a sequence of a throttle heating operation according to a seventh embodiment.

DESCRIPTION OF REFERENCE NUMERALS

2: Throttle valve
15: Intake air channel
4: Heating element (electric heater)
53: Controller (throttle-valve heating control means)
54: Air flow sensor (intake-air quantity detection means)
55: Temperature sensor (intake-air temperature detection means)
56: Bore temperature sensor (valve temperature detection means)

BEST MODE FOR CARRYING OUT THE INVENTION

The following is a description of preferred embodiments of the present invention, with reference to the accompanying drawings. In this embodiment, a case of application of the present invention as a device for preventing or eliminating freeze bonding of a throttle valve disposed inside a throttle body provided in an air intake system of an automobile engine is explained.

-Configuration of Throttle Valve and Periphery Thereof-

Figure 1:
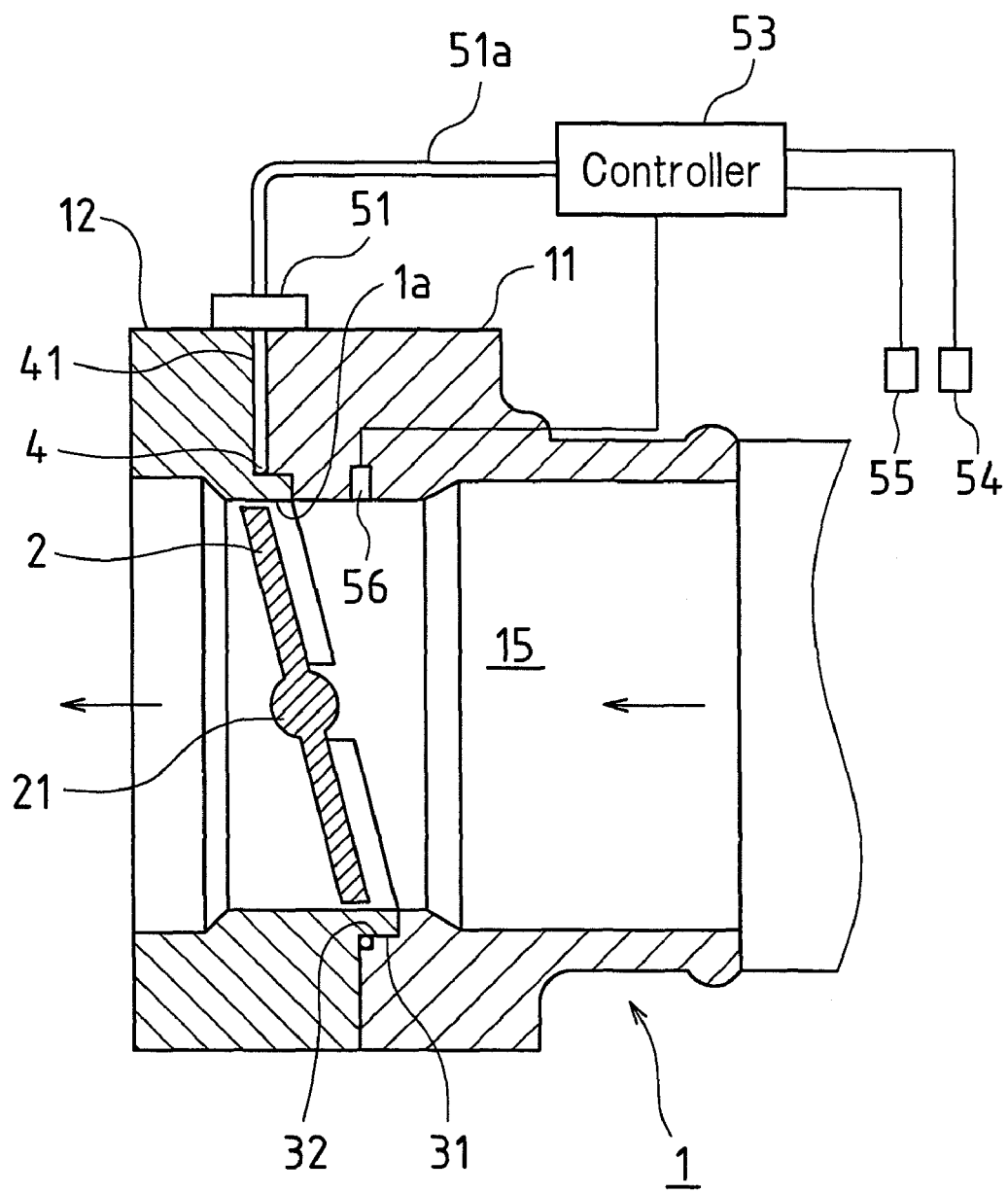
FIG. 1 is a cross-section view showing a peripheral section of a disposition location of a throttle valve according to an embodiment.

FIG. 1 is a cross-section view showing a peripheral section of a location of disposition of the throttle valve according to this embodiment. As shown in this FIG. 1, a throttle valve 2 comprising a butterfly valve is provided in an intake air channel 15, being an interior space of a throttle body 1, and a shaft 21 of this throttle valve 2 is supported so as to be capable of rotating freely on the throttle body 1. The above-mentioned throttle valve 2 and shaft 21 are, for example, formed as one from resin. It should be noted that this throttle valve 2 and shaft 21 may be manufactured of metal. The throttle body 1 is separated in two into a first housing member 11 and a second housing member 12 in a direction of extension (longitudinal direction) of the intake air channel 15 from a shaft support section of the shaft 21.

These housing members 11, 12 are formed of a heat resistant resin such as PI (polyimide), PAI (polyamide imide), PEEK (polyether ether ketone), PPS (polyphenylene sulfide) or the like. A separation surface of the throttle body 1 adheres to an orientation of the throttle valve 2 in a valve closed condition at positions on both the left and right sides of the throttle valve 2, and at positions above and below the throttle valve 2, adheres to a radial direction (vertical direction in the figure), orthogonal to the longitudinal direction of the throttle body 1, from areas in the vicinity of, and opposing, each of an upper edge and a lower edge of the throttle valve 2.

Furthermore, concave and convex step sections 31, 32 are each formed around a full circumference at an upstream side on mutually opposing end faces of the housing members 11, 12 and at a position close to an inner wall surface 1a. FIG. 1 shows a condition of an assembled throttle valve device, and a gap between an inner wall end surface 31b and an outer wall end surface 32b explained hereinafter is closed by the housing members 11, 12, welded through heating of an heating element 4 comprising an electric heater.

Figure 2:
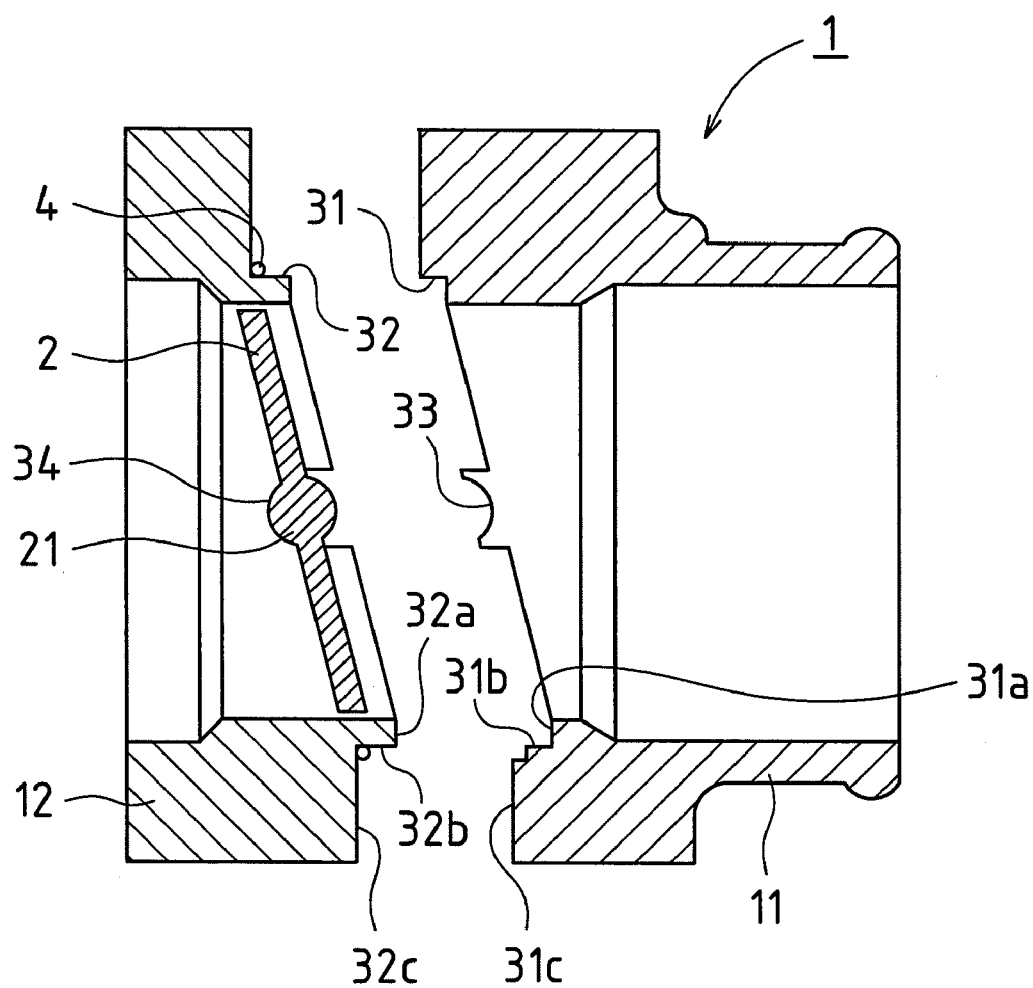
FIG. 2 is a cross-section view showing an intermediate condition of assembly of a throttle valve device.
Figure 3:
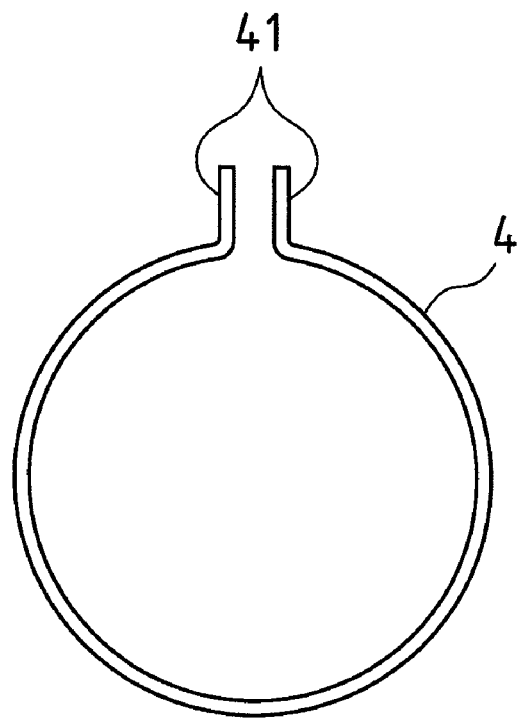
FIG. 3 is a view showing a heating element.

FIG. 2 is a view showing an intermediate condition of assembly of the throttle valve device, and to explain this assembly by way of reference to this figure, the shaft 21 of the throttle valve 2 is fitted into a gap between a pair of split circular arc grooves 33, 34 of the housing members 11, 12 forming the shaft support section of the shaft 21. Then, as shown in FIG. 3, using a heating element 4 comprising a ring shaped, resistance heating wire such as nichrome wire and having a cut-out section and both ends bent outward, this heating element 4 is fitted into the bottom of the convex step section 32 of the second housing member 12 and is wound, and next, the first housing member 11 and the second housing member 12 are fitted together at the step sections 31, 32.

In FIG. 2, the step section 31 of the first housing member 11 comprises an inner periphery side, upstream end surface 31a, an inner wall end surface 31b, and an outer periphery side, upstream end surface 31c, and the step section 32 of the second housing member 12 comprises an inner periphery side, downstream end surface 32a, an outer wall end surface 32b, and an outer periphery side, downstream end surface 32c. Positioning of the first housing member 11 and the second housing member 12 in an axial direction occurs due to contact between the inner periphery side, upstream end surface 31a and the inner periphery side, downstream end surface 32a.

A radial-direction clearance is provided between the above-mentioned inner wall end surface 31b and outer wall end surface 32b such that, when the resin deforms upon heating of the heating element 4 in order to weld the first housing member 11 and the second housing member 12, the resin can escape into this clearance. As a result thereof, flowing of the deformed resin towards the throttle valve 2 is prevented and sticking to the throttle valve 2 is prevented. The configuration is such that, after welding of the first housing member 11 and the second housing member 12, the outer periphery side, upstream end surface 31c and the outer periphery side, downstream end surface 32c make close contact.

Figure 4:
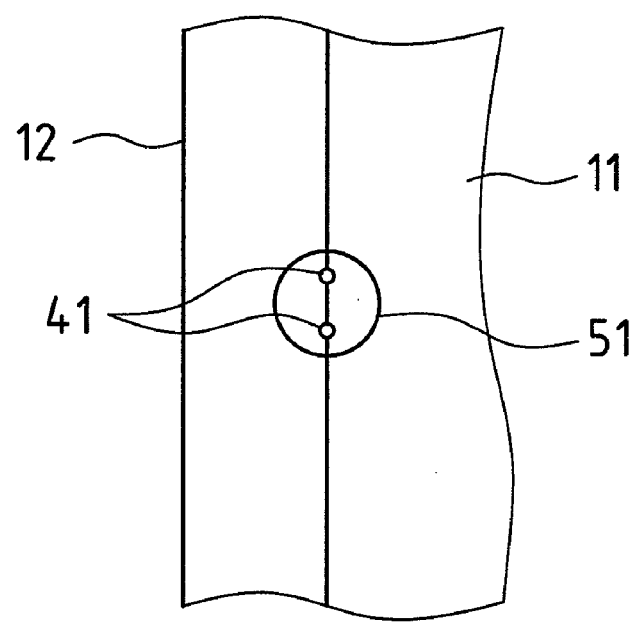
FIG. 4 is a plan view showing a support section of a socket of the heating element.

Furthermore, as shown in FIG. 1 and FIG. 4, a socket 51 is provided straddling outer peripheral surfaces of the housing members 11, 12, and a tip section of a bent end 41 of the heating element 4 is connected to this socket 51. Then, while pressing together the housing members 11, 12, a current sufficient for melting of the resin constituting a material of the housing members 11, 12, such as a current whereat a surface temperature of the heating element 4 becomes approximately 250° C., is supplied to the heating element 4, and as a result, the housing members 11, 12 are welded together, thus forming the throttle body 1 constituting the housing of the throttle valve device. Heating of the heating element 4 upon welding of the housing members 11, 12 may be performed by supplying current from a controller (throttle-valve heating control means) 53 explained hereinafter to the heating element 4 or by supplying current from a dedicated power supply for assembly to the heating element 4. It should be noted that, for the sake of convenience, the socket 51 and the bent end 41 of the heating element 4 are not shown in FIG. 2.

Furthermore, an air flow sensor (intake-air quantity detection means) 54 for detecting a quantity of intake air (intake air quantity) and a temperature sensor (intake-air temperature detection means) 55 for measuring a temperature of intake air (intake air temperature) are provided on an upstream side of the throttle valve 2, and this embodiment is configured such that output signals from these sensors 54, 55 are input into a controller 53. In addition, a bore temperature sensor (valve temperature detection means) 56 for detecting an inner wall temperature (peripheral temperature of the throttle valve 2) of the intake air channel 15 is provided in the vicinity of the disposition location of the throttle valve 2 within the throttle body 1, and this embodiment is configured such that an output signal from this bore temperature sensor 56 is input into the controller 53. This controller 53 is connected to the above-mentioned socket 51 via a wire 51*a*, and a role thereof is to control a current value of the heating element 4 such that the inner wall surface of the throttle body 1 (inner wall of intake air channel 15) is maintained at an optimum temperature. An explanation of a current value control operation of the heating element 4 by the controller 53 is provided hereinafter.

-Heating Operation-

Next, a plurality of embodiments are explained in terms of a heating operation within a device for controlling heating of a throttle valve configured as explained above.

First Embodiment

In the first embodiment, control performing on/off switching of conductance of electricity to the heating element 4 is carried out in accordance with the quantity of intake air detected by the above-mentioned air flow sensor 54. Specifically, the controller 53 receives an output signal from the air flow sensor 54, and when the quantity of intake air is equal to or less than a predetermined "intake air quantity criterion for heating", conductance of electricity to the heating element 4 is carried out (electricity conductance ON). Conversely, when the quantity of intake air is greater than this "intake air quantity criterion for heating", conductance of electricity to the heating element 4 is not carried out (electricity conductance OFF). This "intake air quantity criterion for heating" is, for example, 30 g/sec. This value is not limited thereto and may be freely set. Furthermore, the current value upon conductance of electricity to the heating element 4 is set so as to allow the inner wall temperature of the intake air channel 15 (temperature detected by the bore temperature sensor 56) to rise to the freezing point temperature or thereabove (for example, 5° C.) in a short period of time.

Hereinafter, a reason for controlling on/off switching of conductance of electricity to the heating element 4 as above is explained. When the quantity of intake air exceeds the above-mentioned "intake air quantity criterion for heating" during driving of the engine in, for example, a case wherein the engine speed is relatively high, such as during high speed driving of a vehicle, etc., even if heating is performed by conducting electricity to the heating element 4, the majority of a quantity of heat thereof is lost to intake air flowing through the intake air channel 15, and therefore, a contribution of the heat generation quantity of the heating element 4 to heating of the throttle valve 2 and the peripheral section thereof reduces to almost zero. For this reason, this embodiment is configured such that, when the quantity of intake air exceeds the "intake air quantity criterion for heating", by preventing the conductance of electricity to the heating element 4 in this way, a wasteful heating operation is prevented from occurring. For example, in order to heat the throttle valve 2 and the peripheral section thereof to the freezing point temperature or thereabove when the throttle valve 2 is in a fully opened condition, hundreds of W of electrical power are required. The first embodiment is configured such that this consumption of electrical power is eliminated.

Meanwhile, when the quantity of intake air is equal to or less than the above-mentioned "intake air quantity criterion for heating", in a case wherein, for example, the engine speed is relatively low, such as during low speed driving of the vehicle or an idling operation, etc., the amount of the heat generation quantity of the heating element 4 lost to the intake air flowing through the intake air channel 15 is small. Furthermore, as intake air is not flowing through the intake air channel 15 when the engine is stopped (for example, when the ignition key is in an accessory position), most of the heat generation quantity of the heating element 4 can be made to contribute to heating of the throttle valve 2 and the peripheral section thereof. For this reason, this embodiment is configured such that, when the intake air quantity is equal to or less than the "intake air quantity criterion for heating" in this way (including when the intake air quantity is "0"), electricity is conducted to the heating element 4 so that an effective heating operation can be carried out. For example, tens of W of electrical power are sufficient to heat the throttle valve 2 and the peripheral section thereof to the freezing point temperature or thereabove during an idling operation wherein the throttle valve 2 is substantially fully closed, and furthermore, an effective heating operation can be carried out.

It should be noted that, with regard to an action that ends the heating operation after starting thereof through conductance of electricity to the heating element 4 as described above, when the temperature of the throttle valve 2 and the peripheral section thereof have reached at a "heating completion temperature" being equal to or greater than the freezing point temperature, conductance of electricity to the heating element 4 is stopped and the heating operation is ended. A specific example of this "heating completion temperature" is 5° C. In an embodiment described hereinafter also, this action that ends the heating operation is identical.

In this way, with the first embodiment, it is possible to effectively prevent or eliminate freeze bonding of the throttle valve 2, while also improving the fuel consumption rate of the automobile, by keeping energy loss low (no carrying out of wasteful heating operations) through control of conductance of electricity to the heating element 4 according to the intake air quantity.

Second Embodiment

In the second embodiment also, control performing on/off switching of conductance of electricity to the heating element 4 is carried out in accordance with the quantity of intake air detected by the above-mentioned air flow sensor 54. Specifically, the controller 53 is configured such that it receives an output signal from the air flow sensor 54 and the larger the quantity of intake air, the smaller the quantity of conductance of electricity to the heating element 4 (the smaller the current value) is set thereby. That is to say, it varies the heat generation quantity of the heating element 4 according to the quantity of intake air.

In other words, in a condition wherein, even if heating is performed by conducting electricity to the heating element 4, an intake air quantity whereat the majority of the quantity of heat thereof is lost to intake air is large, the quantity of conductance of electricity to the heating element 4 is set smaller (current value is set smaller) or is set to "0" (current value is "0"). In this way, this embodiment is configured so as to prevent wasteful conductance of electricity. In contrast, in a condition of low or "0" intake air quantity wherein most of the heat generation quantity of the heating element 4 can be made to contribute to heating of the throttle valve 2 and the peripheral section thereof (for example, when the ignition key is in an accessory position), the quantity of conductance of electricity to the heating element 4 is set larger. In addition, this embodiment is configured such that, the smaller the quantity of intake air, the larger the quantity of conductance of electricity to the heating element 4 (the larger the current value) is set, so that the heat generation quantity of the heating element 4 can be made to contribute effectively to heating of the throttle valve 2 and the peripheral section thereof. As a result thereof, it becomes possible to effectively prevent or eliminate freeze bonding of the throttle valve 2, as in the case of the above-mentioned first embodiment.

Third Embodiment

The third embodiment controls a current value upon conductance of electricity to the heating element 4 according to the temperature of intake air (intake air temperature) detected by the above-mentioned temperature sensor 55. Specifically, the controller 53 is configured such that it receives an output signal from the temperature sensor 55 and the higher the temperature of the intake air, the smaller the quantity of conductance of electricity to the heating element 4 (the smaller the current value) is set thereby. That is to say, it varies the heat generation quantity of the heating element 4 according to the temperature of the intake air.

In other words, as the likelihood of freeze bonding of the throttle valve 2 is low in a condition wherein the temperature of the intake air is relatively high, the quantity of conductance of electricity to the heating element 4 is set smaller or to "0" in such a condition. In this way, this embodiment is configured such that wasteful conductance of electricity does not occur. In contrast, as the likelihood of present or future freeze bonding of the throttle valve 2 is high in a condition wherein the temperature of the intake air is relatively low, the quantity of conductance of electricity to the heating element 4 is set larger in such a condition. In addition, this embodiment is configured such that, the smaller this temperature of the intake air, the larger the quantity of conductance of electricity to the heating element 4 is set, so that freeze bonding of the throttle valve 2 can be reliably prevented or eliminated.

More specifically, conductance of electricity to the heating element 4 is not carried out in summer, and the quantity of conductance of electricity to the heating element 4 is set larger only in winter and in a time band wherein the outside air temperature is particularly low. By setting the quantity of conductance of electricity to the heating element 4 larger only in limited conditions in this way, it is possible to keep energy loss low.

Fourth Embodiment

The fourth embodiment determines a timing for conductance of electricity to the heating element 4 in terms of time. Specifically, a timer (timer means) is provided in the interior of the above-mentioned controller 53, and this timer measures an elapsed time after ending of a previous heating operation of the heating element 4. Furthermore, this embodiment is configured such that, when a predetermined "elapsed time criterion for heating" has elapsed after ending of the previous heating operation of the heating element 4, conductance of electricity to the heating element 4 starts. A specific example of this "elapsed time criterion for heating" is 10 min. This time is not limited thereto and may be freely set.

With the fourth embodiment, it is possible to avoid a situation wherein strong freeze bonding occurs as a result of a large quantity of ice adhering to the periphery of the throttle valve 2 by regularly performing a freeze bonding prevention operation or freeze bonding elimination with respect to the throttle valve 2 through an operation of conductance of electricity to the heating element 4 at each predetermined timing (each predetermined elapsed time).

Fifth Embodiment

The fifth embodiment determines a timing for conductance of electricity to the heating element 4 using a cumulative intake air quantity. Specifically, the controller 53 receives an output signal from the above-mentioned air flow sensor 54 and calculates a cumulative value of the intake air quantity after ending of a previous heating operation of the heating element 4 (calculation operation by a cumulative intake-air quantity calculation means). Furthermore, this embodiment is configured such that, when a predetermined "cumulative intake-air quantity criterion for heating" is reached after ending of the previous heating operation of the heating element 4, an operation of conductance of electricity to the heating element 4 starts. A specific example of this "cumulative intake-air quantity criterion for heating" is $2 \times 10^5$ L (200,000 liters). This intake air quantity is not limited thereto and may be freely set.

Also with the fifth embodiment, it is possible to avoid a situation wherein strong freeze bonding occurs as a result of a large quantity of ice adhering to the periphery of the throttle valve 2 by regularly performing a freeze bonding prevention operation or freeze bonding elimination with respect to the throttle valve 2 through the operation of conductance of electricity to the heating element 4 at each predetermined timing (each predetermined cumulative intake air quantity).

-Preheating Operation-

Next, with regard to an operation for preheating the throttle valve and the peripheral section thereof (preheating operation by a preheating means) that can be applied to each of the above-explained embodiments, an explanation of two types (a first preheating operation and a second preheating operation) is provided. Although the throttle valve 2 and the peripheral section thereof were heated to the freezing point temperature or thereabove in order to reliably prevent or eliminate freeze bonding of the throttle valve 2 in each of the above-explained embodiments, the heating temperature of the heating element 4 need not necessarily be raised to the freezing point temperature or thereabove with this preheating operation.

(First Preheating Operation)

In the first preheating operation, the above-mentioned controller 53 receives an output signal from the bore temperature sensor 56 and the periphery of the throttle valve 2 is preheated by conducting electricity to the heating element 4 according to the temperature of the periphery of the throttle valve 2. Furthermore, this operation is configured such that the conductance of electricity to the heating element 4 is ended after a predetermined time has elapsed after starting of this preheating, regardless of the temperature of the periphery of the throttle valve 2 (even if the temperature has not risen to the freezing point temperature or thereabove).

For example, the above-mentioned preheating operation is performed only for 1 min. at a point in time whereat the temperature of the periphery of the throttle valve 2 has become −20° C. Furthermore, in a case wherein the temperature of the periphery of the throttle valve 2 has dropped to −40° C., the above-mentioned preheating operation is performed for 5 min. These values are not limited thereto and may be freely set.

In this way, the first preheating operation performs intermittent preheating, whereby a preheating operation is performed each time a predetermined preheating condition is satisfied. As a result of performing this preheating operation, the quantity of ice adhering to the periphery of the throttle valve 2 becomes lower or a relatively high temperature of the periphery of the throttle valve 2 is maintained upon starting of a heating operation of the heating element 4 (operation for heating the throttle valve 2 and the peripheral section thereof to the freezing point temperature or thereabove) in response to a need for elimination of freeze bonding of the throttle valve 2. Accordingly, it is possible to rapidly elevate the periphery of the throttle valve 2 to the freezing point temperature or thereabove after starting of the heating operation of the heating element 4, and elimination of freeze bonding of the throttle valve 2 can be completed in a short period of time. As a result thereof, energy loss can be reduced through shortening of the heating operation time of this heating element 4.

(Second Preheating Operation)

The second preheating operation performs a freeze-bonding prevention operation or freeze-bonding elimination operation with respect to the throttle valve 2 (operation for heating the throttle valve 2 and the peripheral section thereof to the freezing point temperature or thereabove), and then, even if this operation has ended, performs preheating of the periphery of the throttle valve 2 by continuing the conductance of electricity to the heating element 4. That is to say, it is configured so as to perform heating of the heating element 4 continuously by conducting electricity to the heating element 4 at a current of a value lower than a current value upon execution of the above-mentioned freeze-bonding prevention operation or freeze-bonding elimination operation.

In this way, the second preheating operation performs continuous preheating by continuously conducting electricity to the heating element 4. With this preheating operation also, the quantity of ice adhering to the periphery of the throttle valve 2 becomes lower or a relatively high temperature of the periphery of the throttle valve 2 is maintained upon starting of a heating operation of the heating element 4 in response to a need for elimination of freeze bonding of the throttle valve 2. Accordingly, it is possible to rapidly elevate the periphery of the throttle valve 2 to the freezing point temperature or thereabove after starting of the heating operation of the heating element 4, and elimination of freeze bonding of the throttle valve 2 can be completed in a short period of time. As a result thereof, energy loss can be reduced through shortening of the heating operation time of this heating element 4.

Sixth Embodiment

Figure 5:
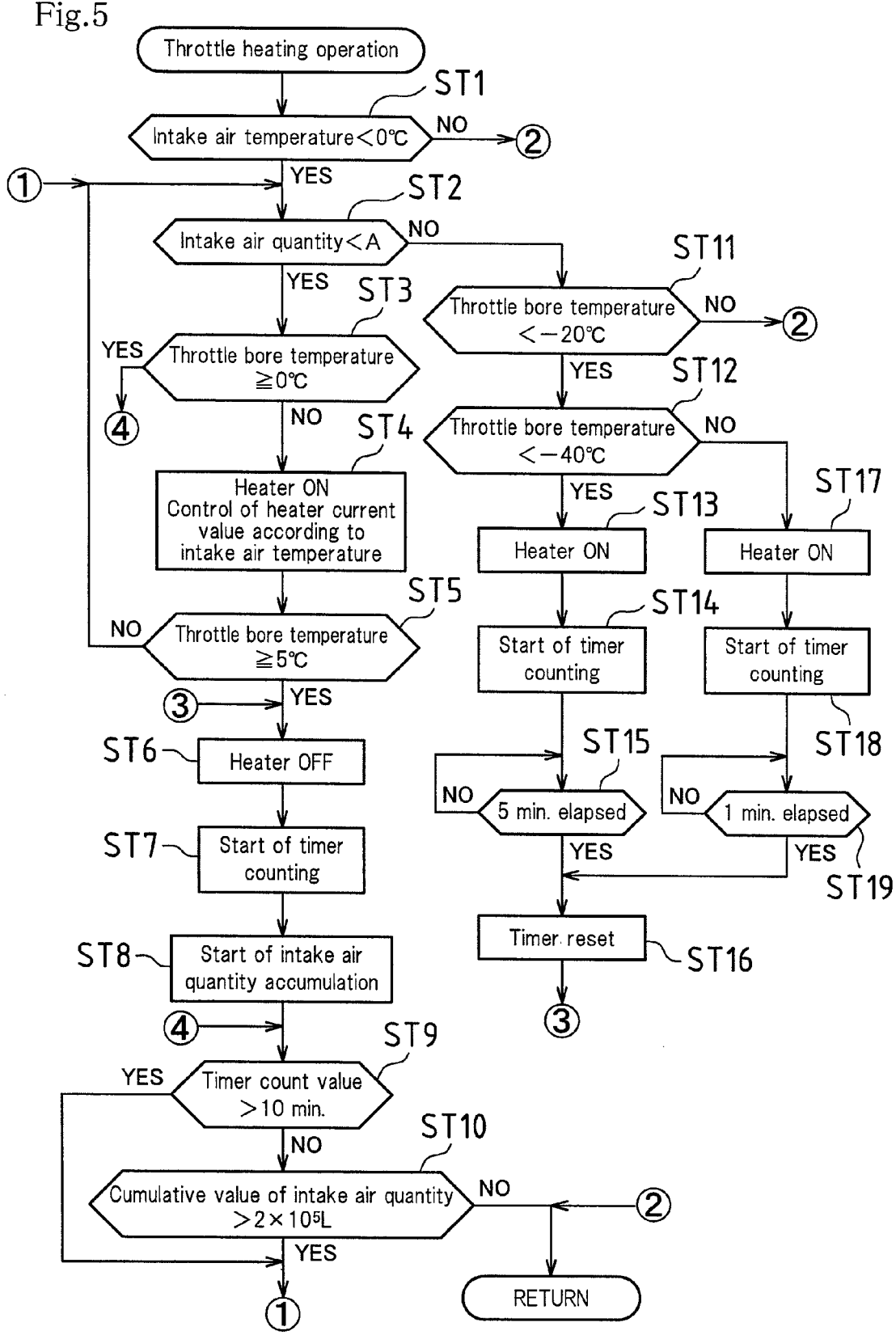
FIG. 5 is a flowchart for explaining a sequence of a throttle heating operation according to a sixth embodiment.

Next, a sixth embodiment combining a plurality of the above-explained embodiments is explained. The sixth embodiment combines the above-mentioned first, second, and third embodiments and the above-mentioned first preheating operation. Hereinafter, a specific control operation is explained following the flowchart of FIG. 5. It should be noted that a control operation in a case wherein the engine is in a driving condition is explained here.

First of all, in step ST1, it is determined whether or not an intake air temperature detected by the above-mentioned temperature sensor 55 is less than 0° C. This control is required in winter and in other cases wherein an external air temperature is low and is not required in summer, and therefore, the purpose of this operation is to determine whether or not an external air temperature condition is such that this control operation is likely to be necessary. Accordingly, this control operation is ended in a case wherein a NO judgment (intake air temperature is equal to or greater than 0° C.) is made in this step ST1.

If a YES judgment (intake air temperature is less than 0° C.) is made in this step ST1, the procedure moves to step ST2, and it is determined whether or not a quantity of intake air (intake air quantity) detected by the above-mentioned air flow sensor 54 is less than a predetermined value A (above-mentioned "intake air quantity criterion for heating"). Furthermore, if a YES judgment (quantity of intake air is less than the predetermined value A) is made here, the procedure moves to step ST3, and it is determined whether or not a throttle bore temperature detected by the above-mentioned bore temperature sensor 56 is equal to or greater than 0° C.

If a NO judgment is made in this step ST3, or in other words, in a case wherein the quantity of intake air is less than the predetermined value A and the throttle bore temperature is less than 0° C., the procedure moves to step ST4, and assuming a condition wherein the heat generation quantity of the heating element 4 can be made to contribute effectively to heating of the throttle valve 2 and the peripheral section thereof, a heating operation is started by conducting electricity to the heating element 4. The heating operation in this step ST4 is carried out such that, the lower the intake air temperature detected by the above-mentioned temperature sensor 55, the larger the quantity of conductance of electricity to the heating element 4 is set.

After this heating operation has been carried out, the procedure moves to step ST5, and it is determined whether or not the throttle bore temperature has reached 5° C. That is to say, during a period of satisfaction of a condition that the above-mentioned quantity of intake air is less than the predetermined value A, and in addition, that the throttle bore temperature is less than 0° C., the above-mentioned heating operation is continued until the throttle bore temperature reaches 5° C. Then, when the throttle bore temperature reaches 5° C. and a YES judgment is made in step ST5, the procedure moves to step ST6, and the heating operation is ended by eliminating the conductance of electricity to the heating element 4.

After the heating operation has been ended in this way, counting of a timer provided in the controller 53 is started in step ST7. Furthermore, in step ST8, the controller 53 receives an output signal from the above-mentioned air flow sensor 54 and starts accumulation of the quantity of intake air.

In step ST9, it is determined whether or not a count value of the above-mentioned timer has exceeded 10 min, and in step ST10, it is determined whether or not the cumulative value of the quantity of intake air has exceeded $2 \times 10^5$ L (200,000 liters). If a YES judgment is made in either this step ST9 or this step ST10, the procedure returns to the above-mentioned step ST2, and in a case of satisfaction of a condition that the above-mentioned quantity of intake air is less than the predetermined value A (YES judgment in step ST2), and in addition, that the throttle bore temperature is less than 0° C. (NO judgment in step ST3), a heating operation is again started by conducting electricity to the heating element 4. In this heating operation also, the lower the intake air temperature, the larger the quantity of conductance of electricity to the heating element 4 is set.

In a case wherein a YES judgment (throttle bore temperature is equal to or greater than 0° C.) is made in the above-mentioned step ST3, the procedure moves to an operation performed in step ST9 and subsequent steps. That is to say, conductance of electricity to the heating element 4 is not carried out while the throttle bore temperature is being maintained in a condition at 0° C. or thereabove after starting of timer counting pursuant to ending of the heating operation and starting of accumulation of the quantity of intake air, and if a YES judgment is made in either step ST9 or ST10 before this throttle bore temperature becomes less than 0° C., the procedure moves to step ST2 and switches to control according to the intake air quantity. In other words, the heating operation is restarted by conducting electricity to the heating element 4 only in cases wherein the quantity of intake air is less than the predetermined value A and the throttle bore temperature has become less than 0° C. after a YES judgment is made in either step ST9 or ST10.

Furthermore, in a case wherein the engine speed increases due to the automobile moving off, etc. and a NO judgment is made in the above-mentioned step ST2, the procedure moves to a preheating execution judgment operation performed in step ST11 and subsequent steps after resetting the above-mentioned timer. Hereinafter, this preheating execution judgment operation is explained.

In step ST11, it is determined whether or not the throttle bore temperature detected by the bore temperature sensor 56 is less than −20° C. If a YES judgment (throttle bore temperature is less than −20° C.) is made here, the procedure moves to step ST12, and it is determined whether or not the throttle bore temperature is less than −40° C. In addition, in a case wherein a YES judgment is made in this step ST12, or in other words, a case wherein it is determined that the throttle bore temperature is less than −40° C., the procedure moves to step ST13, and an operation of conductance of electricity to the heating element 4 for the purpose of preheating is started. Counting of the above-mentioned timer is started (step ST14) at the same time as starting of this preheating operation, and in a case wherein this preheating operation continues for 5 min. (a case wherein a YES judgment is made in step ST15), the procedure moves to step ST16, and after resetting the above-mentioned timer, the preheating operation is ended by eliminating the conductance of electricity to the heating element 4 in step ST6.

Meanwhile, in a case wherein a NO judgment is made in this step ST12, or in other words, a case wherein it is determined that the throttle bore temperature is equal to or less than −20° C. and equal to or greater than −40° C., the procedure moves to step ST17, and an operation of conductance of electricity to the heating element 4 for the purpose of preheating is started. Counting of the above-mentioned timer is started (step ST18) at the same time as starting of this preheating operation, and in a case wherein this preheating operation continues for 1 min. (a case wherein a YES judgment is made in step ST19), the procedure moves to step ST16, and after resetting the above-mentioned timer, the preheating operation is ended by eliminating the conductance of electricity to the heating element 4 in step ST6.

With an operation of the sixth embodiment, it is possible to execute the above-mentioned first, second, and third embodiments and the above-mentioned first preheating operation together, to reliably prevent or eliminate freeze bonding of the throttle valve 2, and in addition, to reduce energy loss due to shortening of a time required for the above-mentioned freeze-bonding prevention operation or freeze-bonding elimination operation pursuant to a preheating operation.

Seventh Embodiment

Next, a seventh embodiment combining a plurality of the above-explained embodiments is explained. The seventh embodiment combines the above-mentioned first, second, and third embodiments and the above-mentioned second preheating operation. Hereinafter, a specific control operation is explained following the flowchart of FIG. 6. It should be noted that a control operation in a case wherein the engine is in a driving condition is explained here also. Furthermore, in the explanation hereinafter, only differences with respect to the above-mentioned sixth embodiment are explained.

As shown in FIG. 6, in an operation of the seventh embodiment, operations of steps ST1 to ST5 are identical to those of the above-mentioned sixth embodiment. Furthermore, in a case wherein a YES judgment (throttle bore temperature has reached 5° C.) is made in this step ST5, the procedure moves to step ST20 and transitions to a heater preheating mode. In this heater preheating mode, the above-mentioned second preheating operation is performed. That is to say, heating of the heating element 4 is made to occur continuously by conducting electricity to the heating element 4 at a current of a value smaller than a current value (current value in step ST4) upon execution of the above-mentioned freeze-bonding prevention operation or freeze-bonding elimination operation.

In a condition of continuous conductance of electricity to the heating element 4 in this way in accordance with the heater preheating mode, the operations of steps ST7 to ST10 of the above-mentioned sixth embodiment are performed.

Meanwhile, in a case wherein the engine speed increases due to the automobile moving off, etc. and a NO judgment is made in step ST2, the procedure moves to step ST21 and transitions to a heater preheating mode similar to that mentioned above.

These heater preheating modes continue until starting of a freeze-bonding prevention operation or a freeze-bonding elimination operation as a result of satisfaction of a condition that the above-mentioned quantity of intake air is less than the predetermined value A (YES judgment in step ST2), and in addition, that the throttle bore temperature is less than 0° C. (NO judgment in step ST3).

With an operation of the seventh embodiment also, it is possible to execute the above-mentioned first, second, and third embodiments and the above-mentioned second preheating operation together, to reliably prevent or eliminate freeze bonding of the throttle valve 2, and in addition, to reduce energy loss due to shortening of a time required for the above-mentioned freeze-bonding prevention operation or freeze-bonding elimination operation pursuant to a preheating operation.

Eighth Embodiment

Next, an eighth embodiment is explained. In the eighth embodiment, the configuration of the electric heater is different from that of the above-mentioned other embodiments.

Specifically, a PTC (Positive Temperature Coefficient) heater is applied as the electric heater. This PTC heater is formed from, for example, a barium titanate-based oxide semiconductor having barium titanate as a principal constituent thereof and made conductive by adding trace amounts of rare earth elements (Y, La, etc.). In addition, when a temperature characteristic is low, current becomes able to flow more freely as a result of overlapping of chains of conductive particles, and conversely, when a temperature is high, current becomes able to flow less freely as a result of expansion of semiconductor particles and breakage of the chains of the conductive particles. That is to say, it has a characteristic of an electrical resistance value increasing in accordance with the temperature becoming higher. For this reason, when a heating operation is started by applying a voltage to the PTC heater at the start of a heating operation of the electric heater, the electrical resistance value of the PTC heater also rises in accordance with a temperature increase thereof and the current value becomes gradually smaller. Consequently, the heater temperature can be maintained at a substantially constant value without any need for a special control operation such as current control, etc., making it possible to simplify a configuration of a heating control device and to prevent overheating of the throttle valve 2 and the peripheral section thereof.

It should be noted that a shape of this PTC heater is not limited to a linear shape similar to the heating element 4 of the above-explained embodiments and may, for example, be a planar shape, etc.

Other Embodiments

In the above-explained embodiments, a case of application of the present invention as a device for preventing or eliminating freezing of the throttle valve 2 disposed inside the throttle body 1 provided in an air intake system of an automobile engine was explained. The present invention is not limited to automobile use and can also be applied in engines used for other purposes.

Furthermore, although in addition to a heating function for a freeze-bonding prevention operation or freeze-bonding elimination operation of the throttle valve 2, a heating function for fusing the housing members 11, 12 together was also provided as a function of the heating element 4 in the above-mentioned embodiments, it is also possible to use a heating element 4 having only the former function.

In addition, although the configuration was such that detection of the temperature of the inner wall surface 1a of the throttle body 1 is carried out using the bore temperature sensor 56, the configuration may be such that, in place thereof, the temperature of the throttle valve 2 itself and the temperature of the shaft 21 are detected, and the quantity of conductance of electricity to the heating element 4 is controlled according to these detected temperatures.

Furthermore, with regard to an arrangement condition of the heating element 4 and the PTC heater, disposition so as to face toward the interior of the intake air channel 15 is also possible. That is to say, in the configuration, the heating element 4 and the PTC heater are mounted on the inner wall surface 1a of the throttle body 1, and these are oriented so as to face the interior of the intake air channel 15. As a result of this, ice occurring inside the intake air channel 15 can be directly heated, and the freeze-bonding elimination operation can be effectively carried out.

Furthermore, although the air flow sensor 54 was employed as an intake-air quantity detection means in the above-mentioned embodiments, the configuration may be such that, in place thereof, the intake air quantity is detected based on a detection signal of a pressure sensor that detects an intake air pressure.

In addition, the "intake air quantity criterion for heating" and the "cumulative intake-air quantity criterion for heating" of the above-mentioned embodiments are not limited to the above-explained values and may be freely set.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2006-164353 filed in Japan on Jun. 14, 2006, the entire contents of which are hereby incorporated by reference. Furthermore, the entire contents of references cited in the present description are hereby specifically incorporated by reference.

The invention claimed is:

1. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity, the device comprising:
an intake-air quantity detection means for detecting a quantity of intake air flowing through the intake air channel; and
a throttle-valve heating control means for receiving an output from the intake-air quantity detection means, conducting electricity to the electric heater when the quantity of intake air flowing in the intake air channel is equal to or less than a predetermined intake air quantity criterion for heating and a contribution can be made to making the throttle valve and the peripheral section thereof equal to or higher than a freezing point temperature using heating by the electric heater, and prohibiting conductance of electricity to the electric heater when the quantity of intake air flowing in the intake air channel is greater than the intake air quantity criterion for heating and, even using heating by the electric heater, a contribution cannot be made to making the throttle valve and the peripheral section thereof equal to or higher than the freezing point temperature.

2. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity, the device comprising:
an intake-air quantity detection means for detecting a quantity of intake air flowing through the intake air channel; and
a throttle-valve heating control means for receiving an output from the intake-air quantity detection means and controlling the conductance of electricity to the electric heater according to the quantity of intake air flowing in the intake air channel,
wherein this throttle-valve heating control means is configured such that, in a case wherein heating using the electric heater is carried out, the greater the quantity of heat lost to the intake air due to a large quantity of intake air flowing through the intake air channel, the smaller the quantity of conductance of electricity to the electric heater is set.

3. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity, the device comprising:

a timer means for measuring an elapsed time after ending of a previous heating operation of the electric heater; and a throttle-valve heating control means for receiving an output from the timer means and starting conductance of electricity to the electric heater when a predetermined elapsed time criterion for heating has elapsed after ending of the previous heating operation of the electric heater.

4. A device for controlling heating of a throttle valve of an internal combustion engine that is provided with an electric heater at a position in the vicinity of a throttle valve disposed inside an intake air channel of the internal combustion engine and heats the throttle valve and a peripheral section thereof by causing this electric heater to perform heating through conductance of electricity, the device comprising:

a cumulative intake-air quantity calculation means for calculating a cumulative value of a quantity of intake air after ending of a previous heating operation of the electric heater; and a throttle-valve heating control means for receiving an output from the cumulative intake-air quantity calculation means and starting an operation of conductance of electricity to the electric heater when the cumulative value of the quantity of intake air after ending of the previous heating operation of the electric heater has reached a predetermined cumulative intake-air quantity criterion for heating.

5. The device for controlling heating of a throttle valve of an internal combustion engine according to claim 1, wherein the heating operation of the electric heater resulting from conductance of electricity to the electric heater continues until the throttle valve and the peripheral section thereof reach a heating completion temperature equal to or greater than a freezing point temperature.

6. The device for controlling heating of a throttle valve of an internal combustion engine according to claim 1, comprising:

a valve temperature detection means for detecting a temperature of the throttle valve or the periphery thereof; and a preheating means for receiving an output from the valve temperature detection means, conducting electricity to the electric heater in order to preheat the throttle valve and the periphery thereof according to the temperature of the throttle valve or the periphery thereof, and ending conductance of electricity to the electric heater, regardless of the temperature of the throttle valve or the periphery thereof, when a predetermined period of time has passed.

7. The device for controlling heating of a throttle valve of an internal combustion engine according to claim 5, wherein, the electric heater is configured to continue heating with a quantity of conductance of electricity to the electric heater set lower than a quantity of conductance of electricity during the heating operation of the electric heater after the throttle valve and the peripheral section thereof have reached the heating completion temperature equal to or greater than a freezing point temperature due to the heating operation of the electric heater resulting from conductance of electricity to the electric heater.

8. The device for controlling heating of a throttle valve of an internal combustion engine according to claim 1, wherein the electric heater is a PTC heater.

9. The device for controlling heating of a throttle valve of an internal combustion engine according to claim 2, wherein the heating operation of the electric heater resulting from conductance of electricity to the electric heater continues until the throttle valve and the peripheral section thereof reach a heating completion temperature equal to or greater than a freezing point temperature.

10. The device for controlling heating of a throttle valve of an internal combustion engine according to claim 2, comprising:

a valve temperature detection means for detecting a temperature of the throttle valve or the periphery thereof; and a preheating means for receiving an output from the valve temperature detection means, conducting electricity to the electric heater in order to preheat the throttle valve and the periphery thereof according to the temperature of the throttle valve or the periphery thereof, and ending conductance of electricity to the electric heater, regardless of the temperature of the throttle valve or the periphery thereof, when a predetermined period of time has passed.

11. The device for controlling heating of a throttle valve of an internal combustion engine according to claim 9, wherein, the electric heater is configured to continue heating with a quantity of conductance of electricity to the electric heater set lower than a quantity of conductance of electricity during the heating operation of the electric heater after the throttle valve and the peripheral section thereof have reached the heating completion temperature equal to or greater than a freezing point temperature due to the heating operation of the electric heater resulting from conductance of electricity to the electric heater.

12. The device for controlling heating of a throttle valve of an internal combustion engine according to claim 2, wherein the electric heater is a PTC heater.

13. The device for controlling heating of a throttle valve of an internal combustion engine according to claim 3, wherein the heating operation of the electric heater resulting from conductance of electricity to the electric heater continues until the throttle valve and the peripheral section thereof reach a heating completion temperature equal to or greater than a freezing point temperature.

14. The device for controlling heating of a throttle valve of an internal combustion engine according to claim 3, comprising:

a valve temperature detection means for detecting a temperature of the throttle valve or the periphery thereof; and a preheating means for receiving an output from the valve temperature detection means, conducting electricity to the electric heater in order to preheat the throttle valve and the periphery thereof according to the temperature of the throttle valve or the periphery thereof, and ending conductance of electricity to the electric heater, regardless of the temperature of the throttle valve or the periphery thereof, when a predetermined period of time has passed.

15. The device for controlling heating of a throttle valve of an internal combustion engine according to claim 13, wherein, the electric heater is configured to continue heating with a quantity of conductance of electricity to the electric heater set lower than a quantity of conductance of electricity during the heating operation of the electric heater after the throttle valve and the peripheral section thereof have reached the heating completion temperature equal to or greater than a freezing point temperature due to the heating operation of the electric heater resulting from conductance of electricity to the electric heater.

16. The device for controlling heating of a throttle valve of an internal combustion engine according to claim 3, wherein the electric heater is a PTC heater.

17. The device for controlling heating of a throttle valve of an internal combustion engine according to claim 4, wherein the heating operation of the electric heater resulting from conductance of electricity to the electric heater continues until the throttle valve and the peripheral section thereof reach a heating completion temperature equal to or greater than a freezing point temperature.

18. The device for controlling heating of a throttle valve of an internal combustion engine according to claim 4, comprising:
 a valve temperature detection means for detecting a temperature of the throttle valve or the periphery thereof; and
 a preheating means for receiving an output from the valve temperature detection means, conducting electricity to the electric heater in order to preheat the throttle valve and the periphery thereof according to the temperature of the throttle valve or the periphery thereof, and ending conductance of electricity to the electric heater, regardless of the temperature of the throttle valve or the periphery thereof, when a predetermined period of time has passed.

19. The device for controlling heating of a throttle valve of an internal combustion engine according to claim 17, wherein,
 the electric heater is configured to continue heating with a quantity of conductance of electricity to the electric heater set lower than a quantity of conductance of electricity during the heating operation of the electric heater after the throttle valve and the peripheral section thereof have reached the heating completion temperature equal to or greater than a freezing point temperature due to the heating operation of the electric heater resulting from conductance of electricity to the electric heater.

20. The device for controlling heating of a throttle valve of an internal combustion engine according to claim 4, wherein the electric heater is a PTC heater.

* * * * *